(12) United States Patent
Greer et al.

(10) Patent No.: US 12,076,919 B2
(45) Date of Patent: Sep. 3, 2024

(54) TILED POROUS ARCHITECTED COMPOSITIONS, METHODS OF THEIR MAKING AND METHODS OF THEIR USE

(71) Applicants: nFugue, Beverly Hills, CA (US); California Institute of Technology, Pasadena, CA (US)

(72) Inventors: Julia R. Greer, Pasadena, CA (US); Andrei Faraon, Pasadena, CA (US); Andrew C. Friedman, Pasadena, CA (US); Seyedeh M. Kamali, Pasadena, CA (US); Phillippe Pearson, Pasadena, CA (US); Farzaneh Afshinmanesh, Pasadena, CA (US); Jim Demetriades, Beverly Hills, CA (US)

(73) Assignees: nFugue, Beverly Hills, CA (US); California Institute of Technology, Pasadena, CA (US)

( * ) Notice: Subject to any disclaimer, the term of this patent is extended or adjusted under 35 U.S.C. 154(b) by 0 days.

(21) Appl. No.: 17/687,493

(22) Filed: Mar. 4, 2022

(65) Prior Publication Data
US 2022/0281164 A1  Sep. 8, 2022

Related U.S. Application Data

(60) Provisional application No. 63/157,495, filed on Mar. 5, 2021.

(51) Int. Cl.
*B29C 64/153* (2017.01)
*B33Y 10/00* (2015.01)
(Continued)

(52) U.S. Cl.
CPC ............ *B29C 64/153* (2017.08); *B33Y 10/00* (2014.12); *B33Y 70/10* (2020.01); *B33Y 80/00* (2014.12);
(Continued)

(58) Field of Classification Search
None
See application file for complete search history.

(56) References Cited

U.S. PATENT DOCUMENTS 10,166,316 B2 * 1/2019 Landon .................. B22F 10/85
10,434,573 B2 * 10/2019 Buller .................... B33Y 40/20
(Continued)

FOREIGN PATENT DOCUMENTS

WO   WO 2017/143077 A1   8/2017
WO   WO 2019/113106 A1   6/2019
WO   WO 2019/226195 A2   11/2019

OTHER PUBLICATIONS

Han et al. Projection Microfabrication of Three-Dimensional Scaffolds for Tissue Engineering. ASME. J. Manuf. Sci. Eng. Apr. 2008; 130(2): 021005 (Year: 2008).*
(Continued)

*Primary Examiner* — Sanza L. McClendon
(74) *Attorney, Agent, or Firm* — Squire Patton Boggs (US) LLP (57) ABSTRACT

Provided herein are compositions having a porous, architected three-dimensional geometry that are tiled to achieve increased surface area and/or volume. The tiled compositions include a plurality of tiles having seams where one of the plurality of tiles contacts an adjacent tile. Also provided herein are methods and systems for making the compositions.

8 Claims, 6 Drawing Sheets

(51) Int. Cl.
  *B33Y 70/10*  (2020.01)
  *B33Y 80/00*  (2015.01)
  *C08F 2/50*   (2006.01)
  *C08K 3/04*   (2006.01)
  *B33Y 50/00*  (2015.01)
(52) U.S. Cl.
  CPC .................. *C08F 2/50* (2013.01); *C08K 3/04* (2013.01); *B33Y 50/00* (2014.12)

(56) References Cited

U.S. PATENT DOCUMENTS

| | | | |
|---|---|---|---|
| 11,498,124 B1* | 11/2022 | Sanders | B22F 3/1115 |
| 2004/0091547 A1* | 5/2004 | Ben-Nissan | C07F 9/4093 |
| | | | 424/602 |
| 2007/0023692 A1 | 2/2007 | Stenger | |
| 2018/0261008 A1* | 9/2018 | Elber | G06T 17/10 |

OTHER PUBLICATIONS

International Search Report and Written Opinion mailed Nov. 30, 2022, for International Application No. PCT/US2022/019013, 16 pages.

* cited by examiner

Tile Center

FIG. 5B

Seam

FIG. 6

TILED POROUS ARCHITECTED COMPOSITIONS, METHODS OF THEIR MAKING AND METHODS OF THEIR USE

CROSS-REFERENCE TO RELATED APPLICATIONS

The present application claims the benefit of U.S. provisional application No. 63/157,495, filed Mar. 5, 2021, the content of which is hereby incorporated by reference in its entirety.

FIELD

Provided herein are compositions having a porous, architected three-dimensional geometry that are tiled to achieve increased surface area and/or volume. Also provided herein are methods and systems for making the compositions.

BACKGROUND

Porous, architected materials can provide compositions that have desirable properties including mechanical strength, impact mitigation, energy absorbance, while also providing low density and/or mass. To date, such compositions have been successfully prepared by additive manufacturing and by lithography. Useful techniques have included, for example, interference lithography, WO 2019/226195, and volumetric beam shaping through metasurface scattering, WO 2019/113106 A1. In such techniques, a photoactive material is activated by radiation patterned through, for example, interference of light shaped by interaction with a metasurface, to yield an architected structures.

However, to date, the porous, architected materials produced by such techniques have been limited in size. In the techniques, the sizes of the radiation beams and metasurfaces have limited the sizes of the resulting materials. What are needed are larger porous, architected compositions, and methods and systems for preparing them.

SUMMARY OF THE INVENTION

Provided herein are compositions providing porous, architected materials of larger size. The compositions comprise a plurality of tiles, each tile adjacent to at least one other tile, forming a seam between the tiles. Advantageously, one or more properties of the composition at each seam are substantially similar to the corresponding one or more properties at an adjacent tile. Such homogeneity is achieved by controlling the preparation of the composition at each seam to match the preparation at each tile. Also provided herein are methods and systems for preparing the compositions.

In one aspect, provided herein are compositions comprising a plurality of tiles. In certain embodiments, the tiles contact each other forming seams. In a certain embodiment, a first tile of the plurality of tiles contacts a second tile of the plurality of tiles; the first tile is adjacent to the second tile; and a seam is formed where the first tile contacts the second tile. In certain embodiments, one or more properties at a seam are substantially similar to the corresponding one or more properties at an adjacent tile. In certain embodiments, the tiled compositions are homogenous for each of the one or more properties. In certain embodiments, the composition has a porous, architected three-dimensional geometry. In certain embodiments, each tile has a porous, architected three-dimensional geometry. In certain embodiments, each seam has a similar or identical porous, architected three-dimensional geometry. In certain embodiments, the tiles and seams have similar or identical porosities.

In another aspect, provided herein are methods of making the compositions. The methods comprise the steps of contacting a first portion of a photoactive pre-polymer with a volume of radiation from a radiation source sufficient to form a first tile; translating the radiation source to a second portion of the photoactive pre-polymer, adjacent to the first portion of the photoactive polymer, wherein the second portion of the photoactive polymer overlaps with the first portion of the previously irradiated photoactive polymer at an overlap region; contacting the second portion of the photoactive polymer with a sufficient volume of radiation to form a second tile. The translating and irradiating steps are repeated to add additional tiles to the composition. In particular embodiments, the method is carried out in such a manner that the amount of radiation exposure at an overlap region is a fraction of the amount of radiation exposure at a tile region. The fractional amount is calculated by the number of total exposures expected for the overlap region. The total fractional exposures should sum to a single exposure at any tile region. Typically, an overlap region is exposed twice, once with each adjacent tile. As such, at each exposure, the overlapping region is exposed at about one-half of the exposure of a tile region. After two exposures at one-half, the total exposure should be about one full exposure compared to an adjacent tile region. From this measured exposure, the overlapping regions of radiation provide seams with substantially the same properties at adjacent tiles.

In some aspects, methods of making the compositions include the steps of contacting a first portion of a photoactive pre-polymer with a volume of radiation from a radiation source sufficient to form a first tile having a tile region therein; translating the radiation source to a second portion of the photoactive pre-polymer, adjacent to the first portion of the photoactive polymer, wherein the second portion of the photoactive polymer overlaps with the first portion of the previously irradiated photoactive polymer at a tile overlap region; contacting the second portion of the photoactive polymer with a sufficient volume of radiation to form a second tile having a tile region therein. The translating and irradiating steps are repeated to add additional tiles to the composition. In particular embodiments, the method is carried out in such a manner that the amount of radiation exposure at a tile overlap region is a fraction of the amount of radiation exposure at one of the corresponding tile regions therein. The fractional amount is calculated by the number of total exposures expected for the tile overlap region. The total fractional exposures should sum to a single exposure at the corresponding tile region. Typically, a tile overlap region is exposed twice, once with each adjacent tile. As such, at each exposure, the tile overlapping region is exposed at about one-half of the exposure of a corresponding tile region. After two exposures at one-half, the total exposure should be about one full exposure compared to an adjacent (e.g., corresponding) tile region. From this measured exposure, the overlapping regions of radiation provide seams with substantially the same properties of the adjacent corresponding tiles.

In another aspect, provided herein are systems for carrying out the methods provided herein. In certain embodiments, the system comprises a translation stage capable of translating a photoactive pre-polymer and a radiation source capable of irradiating the photoactive pre-polymer disposed on the translation stage. In certain embodiments, the radiation source comprises a laser source and a patterned metasurface that interact to form an interference pattern. In certain embodiments, the system is capable of forming a porous, architected three-dimensional geometry in the resulting polymer.

Applications for which these compositions are useful include, but certainly are not limited to, aerospace (e.g., landing gear shock absorption, lightweight panels), automotive (e.g., brake assembly vibration mitigation), medicine (e.g., medical devices requiring particular mechanical properties), military (e.g., body armor), marine devices, and sporting-equipment.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DETAILED DESCRIPTION OF PREFERRED EMBODIMENTS

Definitions

In general, the terms and phrases used herein have their art-recognized meaning, which can be found by reference to standard texts, journal references and contexts known to those skilled in the art. The following definitions are provided to clarify their specific use in the context of the invention.

The term "monolithic" refers to a system, structure, geometry, or other element that is a unitary interconnected and continuous element. In an embodiment, a monolithic element is formed or composed of a material without joints or seams. In an embodiment, the term "interconnected" refers to a system, structure, geometry, or other element of which every first portion or first feature is either (i) directly connected to a second portion or second feature of the system, structure, geometry, or other element, or (ii) indirectly connected to a second portion or second feature of the system, structure, geometry, or other element via a third portion or third feature of the system, structure, geometry, or other element. In an embodiment, no portion or feature of an interconnected system, structure, geometry, or other element is fully isolated from the rest of the system, structure, geometry, or other element. In an embodiment, the term "continuous" refers to a system, structure, geometry, or other element of which every first portion or first feature is directly or indirectly bonded to, fused with, or otherwise belongs to the same uninterrupted phase with respect to a second portion or second feature of system, structure, geometry, or other element. In an embodiment, two features which are connected merely by superficial contact (e.g., touching) but are otherwise isolated with respect to each other, are not continuous. In an embodiment, two distinct features, such as fibers or particles, which are merely touching or are woven together may be interconnected but are not continuous with respect to each other. In an embodiment, a structure or geometry consisting of a plurality of features, such as fibers or particles, each of which is merely touching or woven together with another feature, such as a fiber or particle, may be an interconnected structure or geometry but is not a continuous structure or geometry.

The term "deterministic" refers a system, structure, geometry, or other element characterized by at least one feature and/or at least one property (e.g., vibrational frequency band gap) that is known and/or controlled to be within 20%, preferably within 10%, more preferably within 5%, more preferably within 1%, or more preferably within 0.1% of a determined or desired value. In an embodiment, a deterministic geometry is characterized one or more features each independently having at least one physical dimension which, prior to or during formation of said structure, is pre-determined to be within 20%, preferably within 10%, more preferably within 5%, more preferably within 1%, or more preferably within 0.1% of a determined or desired value. For example, a deterministic architected three-dimensional geometry of a structure comprises a plurality of features, such as trusses, having one or more physical dimensions (e.g., width, thickness, diameter, length) the values of which are within 20%, preferably within 10%, more preferably within 5%, more preferably within 1%, or still more preferably within 0.1% of the value(s) of the one or more physical dimensions designed, such as via a CAD technique, or determined prior to formation of the structure. Stochastic geometries or structures, such as random or natural foams, are not deterministic.

The term "architected" refers to a system, structure, geometry, or feature having features that are designed and formed according to the design. In an embodiment, an architected structure is deterministic or formed according to deterministic process(es). In an embodiment, substantially all features, and physical dimensions thereof, are designed, or pre-determined, and formed according to the design such that the substantially all features, and physical dimensions thereof, are substantially equivalent to those of the design.

The term "three-dimensional geometry" refers to a geometry characterized by a three-dimensional geometric configuration. In an embodiment, a structure has a three-dimensional geometry when a three-coordinate system of physical space is required to fully describe the physical dimensions of a unit cell of the structure. A three-dimensional geometry may be nano-architected and/or micro-architected. In an embodiment, a structure characterized by a nano-architected three-dimensional geometry is a structure characterized one or more features having at least one physical size dimension (e.g., length, width, diameter, or height) the value of which is in the range of approximately 1 nm to less than 1 pm. The one or more "features" include, but are not limited to, beams, struts, ties, trusses, sheets, shells, and nodes. In an embodiment, a structure characterized by a nano-architected three-dimensional geometry is a structure characterized by a unit cell having whose at least one physical size dimension (e.g., length, width, or height) the value of which is in the range of approximately 1 nm to less than 1 pm. In an embodiment, a structure characterized by a micro-architected three-dimensional geometry is a structure characterized one or more features having at least one physical size dimension (e.g., length, width, or height) the value of which is in the range of approximately 1 pm to 1000 pm. In an embodiment, a structure characterized by a micro-architected three-dimensional geometry is a structure characterized by a unit cell having at least one physical size dimension (e.g., length, width, or height) the value of which is in the range of approximately 1 pm to 1000 pm.

The term "unit cell" refers to the smallest arrangement, configuration, or geometry of a plurality of features such that an entire structure, or three-dimensional geometry thereof, characterized by said unit cell can be formed by repetition of said unit cell. For example, repetition of the unit cell in three-dimensions may form a three-dimensional structure. The entire structure may be a three-dimensional structure, such as a three-dimensional porous structure.

The term "average," when used in reference to a material or structure property, refers to a calculated arithmetic mean of at least two, or preferably at least three, identical measurements or calculations of said property. For example, an average density of a structure is the arithmetic mean of at least two measurements performed identically, of the density of said structure.

The term "density" refers to volumetric mass density. Density is represented in units of mass-per-volume (e.g., g/cm3). When referring to a material, the term density corresponds to the volumetric mass density of the material. When referring to a structure, the term density corresponds to the volumetric mass density of the structure, which is a function of the geometric configuration (geometry) of the structure as well as a function of the material(s) of which the structure is formed, such that an increase in porosity of said structure corresponds to a decrease in density of said structure. The density of a structure, such as a structure having a three-dimensional geometry according to an embodiment of the invention, may be measured according a method conventionally known, or not yet known, in the art. For example, the density of a structure may be determined by determining mass, height, and diameter for a disk-shape sample, and then calculating the determined mass divided by volume for the sample, with assuming the sample is substantially a complete circle.

The term "relative density" refers to a volume fraction of solid material in a composite material system, structure, or feature. In an embodiment, a relative density corresponds to a ratio of density of a structure to density solid material (or the combination of materials), of which the structure is composed. Relative density may be represented as a fraction (the ratio of densities) or as a percentage (the ratio of densities×100%). In an embodiment, relative density of a structure, or a three-dimensional geometry thereof, before pyrolysis is substantially the same to that after pyrolysis.

The term "specific strength" refers to a ratio of strength to density of a material, system, structure, or feature where strength refers to force per unit area at the point of failure of the material, element, or structure. Specific strength may also be referred to as strength-to-weight ratio. In an embodiment, "strength" refers to compressive strength. In an embodiment, "strength" refers to tensile strength. In an embodiment, compressive strength is the maximum stress a material can sustain under crush loading. In an embodiment, compressive strength of a material, structure, or element that fails by shattering fracture can be defined within fairly narrow limits as an independent property. In an embodiment, the compressive strength of a material, structure, or element that does not shatter in compression is the amount of stress required to distort the material an arbitrary amount. In an embodiment, compressive strength of a material, structure, system, feature, or element that does not shatter in compression can be calculated as the stress at a 0.2% strain offset from the linear portion in a stress-strain curve. In an embodiment, compressive strength is calculated by dividing the maximum load, on the material, structure, or element, by the original cross-sectional area of the material, structure, or element being examined.

The term "stiffness" refers to an extent to which a material, structure, system, or feature resists deformation in response to an applied force. Stiffness corresponds to a ratio of force applied to a material, structure, or element versus the displacement produced by the applied force along the same degree of freedom (e.g., same axis or direction) exhibited by the material, structure, or element. The term "specific stiffness" refers to a ratio of stiffness to density of the material, element, or structure. In an embodiment, the stiffness of a material, structure, or element is the Young's modulus of the material, structure, or element.

The term "additive manufacture" refers to a process for forming a structure or feature via deposition, or otherwise building up, of a material. The terms "additive manufacture process" and "additive manufacturing process" may be used interchangeably. An additive manufacture process may involve layer-by-layer deposition of a material to form a complex three-dimensional structure or element. The deposited material may include, but is not limited to, inorganic materials, hybrid organic-inorganic materials, polymers, metals, or combinations of these. Exemplary additive manufacture processes include, but are not limited to, 3D printing, stereolithography (SLA), fused deposit modeling (FDM), and 2-photon lithography. In some embodiments, an additive manufacture process does not require a subtractive manufacture to form the structure or element. Examples of subtractive manufacture processes include, but are not limited to, milling, machining, electron discharge machining, carving, shaping, grinding, drilling, and etching. In an embodiment, an additive manufacture process involves or is aided by computer-aided design (CAD).

In an embodiment, the term "defect" may refers to a fabrication-induced imperfection, or unintended feature or property, such as, but not limited to, local deformation, crack, beam junction offset, beam bulging, curvature of a strut, and pit or void.

The term "pre-polymer" or "prepolymer" refers to a monomer or mixture comprising one or more monomers where the monomer(s) have been reacted to an intermediate molecular mass state. The prepolymer is capable of undergoing further polymerization to a fully cured higher molecular weight state. In some embodiments, the terms prepolymer and monomer may be used interchangeably.

As used herein, the term "polymer" refers to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). Polymers are commonly the polymerization product of one or more monomer precursors.

The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, brush, brush block, alternating, segmented, grafted, tapered and other architectures. Useful polymers include organic polymers or inorganic polymers that may be in amorphous, semi-amorphous, crystalline or semi-crystalline states. Polymer side chains capable of cross linking polymers (e.g., physical cross linking) may be useful for some applications.

The term "substantially" refers to a property that is within 35%, 30%, 35%, 30%, 15%, 10%, 5%, or 1%, or is equivalent to a reference property. The term "substantially equal," "substantially equivalent," or "substantially unchanged," when used in conjunction with a reference value describing a property or condition, refers to a value that is within 35%, 30%, 35%, 30%, 15%, 10%, optionally within 5%, optionally within 1%, optionally within 0.1%, or optionally is equivalent to the provided reference value. For example, a ratio is substantially equal to 1 if it the value of the ratio is within 10%, optionally within 5%, optionally within 1%, or optionally equal to 1. The term "substantially greater," when used in conjunction with a reference value describing a property or condition, refers to a value that is at least 2%, optionally at least 5%, or optionally at least 10% greater than the provided reference value. The term "substantially less", when used in conjunction with a reference value describing a property or condition, refers to a value that is at least 2%, optionally at least 5%, or optionally at least 10% less than the provided reference value.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure. Compositions In the following description, numerous specific details of the compositions, methods, and systems are set forth in order to provide a thorough explanation of the precise nature of the embodiments. It will be apparent, however, to those of skill in the art that the invention can be practiced without these specific details.

In one aspect, provided herein are compositions comprising a plurality of tiles. Each tile comprises a porous, architected material. In certain embodiments, the material has a porous, architected three-dimensional geometry.

The material can be any material deemed useful to the person of skill. In certain embodiments, the material is selected from carbon allotrope materials, polymers, ceramic materials, metal materials, and any combination thereof. In certain embodiments, the material is a polymer. In certain embodiments, the material is an organic polymer. In certain embodiments, the material is a carbon allotrope. In certain embodiments, the material is pyrolytic carbon.

In certain embodiments, the material has one or more structures, geometries, or features that are designed and formed according to the design. In certain embodiments, substantially all features, and physical dimensions thereof, are designed, or pre-determined, and formed according to the design such that the substantially all features, and physical dimensions thereof, are substantially equivalent to those of the design.

In certain embodiments, the three-dimensional geometry is nano-architected or micro-architected. In certain embodiments, the material is nano-architected, characterized by one or more features having at least one physical size dimension (e.g., length, width, diameter, or height) the value of which is in the range of approximately 1 nm to less than 1 pm. In certain embodiments, the material is micro-architected, characterized by one or more features having at least one physical size dimension (e.g., length, width, or height) the value of which is in the range of approximately 1 pm to 1000 pm.

In certain embodiments, the material has an architecture described in WO 2019/226195 A1, the contents of which are hereby incorporated by reference in their entirety. In certain embodiments, the material has an architecture described in U.S. Pat. No. 10,553,875 B1, the contents of which are hereby incorporated by reference in their entirety.

In the compositions, the tiles contact each other forming seams. The seams provide one or more structures and properties that are homogenous across the composition. In particular, the seams are designed to form a homogenous composition with the tiles. For each structure or property, the measurement is substantially similar to the corresponding structure or property in an adjacent tile. This is useful to form a composition with uniform properties across the tiles and seams. In certain embodiments, the seams do not provide regions of weakness in the composition. In certain embodiments, the structures are pores. In certain embodiments, the structures are unit cells. In certain embodiments, the structural property is depth. In certain embodiments, properties are selected from porosity, density, strength, and mechanical strength. The methods provided herein are useful for making the seams of the composition.

In certain embodiments, provided herein are compositions comprising a plurality of tiles. In certain embodiments, each tile has a top surface, a bottom surface, and a thickness. In certain embodiments, each tile has a porous architected, three-dimensional geometry. The compositions comprise one or more seams, wherein a first tile of the plurality contacts a second tile of the plurality. In certain embodiments, a first property of the seam is substantially similar to the corresponding property of the first tile or the second tile.

In certain embodiments, a first property of the seam is substantially similar to the corresponding property of the first tile and to the corresponding property of the second tile. In certain embodiments, the porosity of the seam is substantially similar to the porosity of the first tile or the second tile. In certain embodiments, the porosity of the seam is substantially similar to the porosity of the first tile and to the porosity of the second tile. In certain embodiments, the density of the seam is substantially similar to the density of the first tile or the second tile. In certain embodiments, the density of the seam is substantially similar to the density of the first tile and to the density of the second tile. In certain embodiments, the mechanical strength of the seam is substantially similar to the mechanical strength of the first tile or the second tile. In certain embodiments, the mechanical strength of the seam is substantially similar to the density of the first tile and to the mechanical strength of the second tile. In certain embodiments, more than one of these properties are substantially similar.

In certain embodiments, the composition is porous and architected and not periodic. In certain embodiments, the composition is porous, architected, and periodic. In certain embodiments, each tile comprises a lattice of tile unit cells; each seam comprises a lattice of seam unit cells; and the dimensions of the seam unit cells are substantially the same as the dimensions of the tile unit cells.

In certain embodiments, measurements or properties are substantially similar when one they are within 35% of each other. In certain embodiments, measurements or properties are substantially similar when one they are within 30% of each other. In certain embodiments, measurements or properties are substantially similar when one they are within 25% of each other. In certain embodiments, measurements or properties are substantially similar when one they are within 20% of each other. In certain embodiments, measurements or properties are substantially similar when one they are within 15% of each other.

The tiles can have any dimensions deemed useful to the person of skill. In certain embodiments, each tile has a length and width of at least 5 mm. In certain embodiments, each tile has a length and width of at least 10 mm. In certain embodiments, each tile has a length and width of at least 15 mm. In certain embodiments, each tile has length and width dimensions between about 5 mm to about 10 mm. In certain embodiments, each tile has length and width dimensions between about 5 mm to about 100 mm. In certain embodiments, each tile has length and width dimensions between about 5 mm to about 1000 mm. In certain embodiments, each tile has length and width dimensions between about 10 mm to about 100 mm. In certain embodiments, each tile has length and width dimensions between about 10 mm to about 1000 mm. In certain embodiments, each tile has length and width dimensions between about 15 mm to about 100 mm. In certain embodiments, each tile has length and width dimensions between about 15 mm to about 1000 mm.

The tiles can have any depth deemed suitable to the person of skill. In certain embodiments, each tile has a depth from about 0.01 mm to about 1 mm. In certain embodiments, each tile has a depth from of about 0.01 mm to about 0.1 mm. In certain embodiments, each tile has a depth from about 0.01 mm to about 10 mm. In certain embodiments, the composition has the same or substantially the same depth as each tile. In certain embodiments, the composition has a depth from about 0.01 mm to about 1 mm. In certain embodiments, the composition has a depth from of about 0.01 mm to about 0.1 mm. In certain embodiments, the composition has a depth from about 0.01 mm to about 10 mm.

The composition can have any dimensions deemed suitable to the person of skill. Advantageously, tiling permits preparing of compositions of almost limitless size with homogeneity at the seams. In certain embodiments, the composition has length and width dimensions that are at least three times the tile length and width dimensions. In certain embodiments, the composition has length and width dimensions that are at least five times the tile length and width dimensions. In certain embodiments, the composition has length and width dimensions that are at least ten times the tile length and width dimensions. In certain embodiments, the composition has length and width dimensions that are at least fifteen times the tile length and width dimensions. In certain embodiments, the composition has length and width dimensions of about 10 mm to about 100 mm. In certain embodiments, the composition has length and width dimensions of about 10 mm to about 1000 mm. In certain embodiments, the composition has length and width dimensions of about 10 mm to 10,000 mm.

The tiles and composition can be of any material deemed suitable to the person of skill. In certain embodiments, the composition comprises a polymer. In certain embodiments, the composition comprises an organic polymer. In certain embodiments, the composition comprises a polymer from photoactive pre-polymers. In certain embodiments, the composition comprises a polymer from photoactive epoxy-based pre-polymers. In certain embodiments, the composition comprises a polymer of SU-8. In certain embodiments, the composition comprises SU-8 2000, SU-3000, SU-8 GLM2060, SU-8 GCM3060, SU-8 GMC 10xx, SU-8 GMJB 10XX, SU-8 GM10XX. Useful pre-polymers are readily available from commercial and research sources.

Methods of Making

In another aspect, provided herein are methods of making the compositions. In the methods, a first portion of a photoactive pre-polymer is contacted with a volume of radiation from a radiation source sufficient to form a first tile. The first tile has a first tile region therein. In a next step, the radiation source is translated to a second portion of the photoactive pre-polymer, adjacent to the first portion of the photoactive polymer. The radiation source can move, or the pre-polymer can move, or there can be a combination of movements. In this step, the second portion of the photoactive polymer overlaps with the first portion of the previously irradiated photoactive polymer to form an overlap region (e.g., a tile overlap region). The overlap region will define a seam of the composition. In a further step, the second portion of the photoactive polymer is contacted with a sufficient volume of radiation to form a second tile. The second tile has a second tile region therein.

In the methods, the translating and irradiating steps are repeated to add additional tiles to the composition. The tiles can be arranged in any pattern deemed suitable to the person of skill. The tiles can be arranged linearly by linear translation in a single dimension. Translation in a second dimension provides an array of tiles. The array can form any shaped desired, for instance, square, rectangular, or any other shape that can be built with the tiles.

In particular embodiments, the method is carried out in such a manner that the amount of radiation exposure at an overlap region (e.g., the tile overlap region) is a fraction of the amount of radiation exposure at a tile region. The fractional amount is calculated by the number of total exposures expected for the overlap region. The total fractional exposures should sum to a single exposure at any tile region. If an overlap region is to be exposed twice, the fraction is one-half. If an overlap region is to be exposed three times, the fraction is one-third. If an overlap region is to be exposed four times, the fraction is one-fourth. When all of the fractional exposures are summed together, the sum should equal about one single exposure of a tile region. From this measured exposure, the overlapping regions of radiation provide seams with substantially the same properties at adjacent tiles.

Typically, an overlap region is exposed twice, once with each adjacent tile. As such, at each exposure, the overlapping region is exposed at about one-half of the exposure of a tile region. After two exposures at one-half, the total exposure should be about one full exposure compared to an adjacent tile region.

In certain embodiments, the total exposure at each overlap region is sufficient to form seams with one or more properties substantially similar the corresponding one or more properties of an adjacent tile. In certain embodiments, the photoactive pre-polymer is disposed on a translation stage capable of performing the translating steps. The translation stage can be any translation stage deemed suitable to the person of skill. In certain embodiments, the translation stage is a stepper. In certain embodiments, the photoactive prepolymer is disposed on a stage, and the radiation source is translated relative to the photoactive pre-polymer. In certain embodiments, the radiation source is translated with a stepper.

In certain embodiments, the radiation source comprises a laser source and a patterned metasurface. Useful patterned metasurfaces are described in WO 2019/113106 A1, the contents of which are hereby incorporated in their entirety. In certain embodiments, the laser source and the patterned metasurface interact to form an interference pattern capable of forming the unit cells in the photoactive polymer.

Systems

In another aspect, provided herein are systems for carrying out the methods provided herein. In certain embodiments, the system comprises a translation stage capable of translating a photoactive pre-polymer and a radiation source capable of irradiating the photoactive pre-polymer disposed on the translation stage. In certain embodiments, the system comprises a translatable radiation source capable of being translated relative to the photoactive pre-polymer. In certain embodiments, the translation is provided by a stepper.

In certain embodiments, the radiation source comprises a laser source and a patterned metasurface that interact to form an interference pattern. In certain embodiments, the system is capable of forming a porous, architected three-dimensional geometry in the resulting polymer. In certain embodiments, the laser source and the patterned metasurface interact to form an interference pattern capable of forming a porous, architected three-dimensional geometry in the resulting polymer.

Example 1: Preparation of Tiled Composition

The present example provides a tiled composition prepared according to the compositions and methods described herein.

Figure 1:
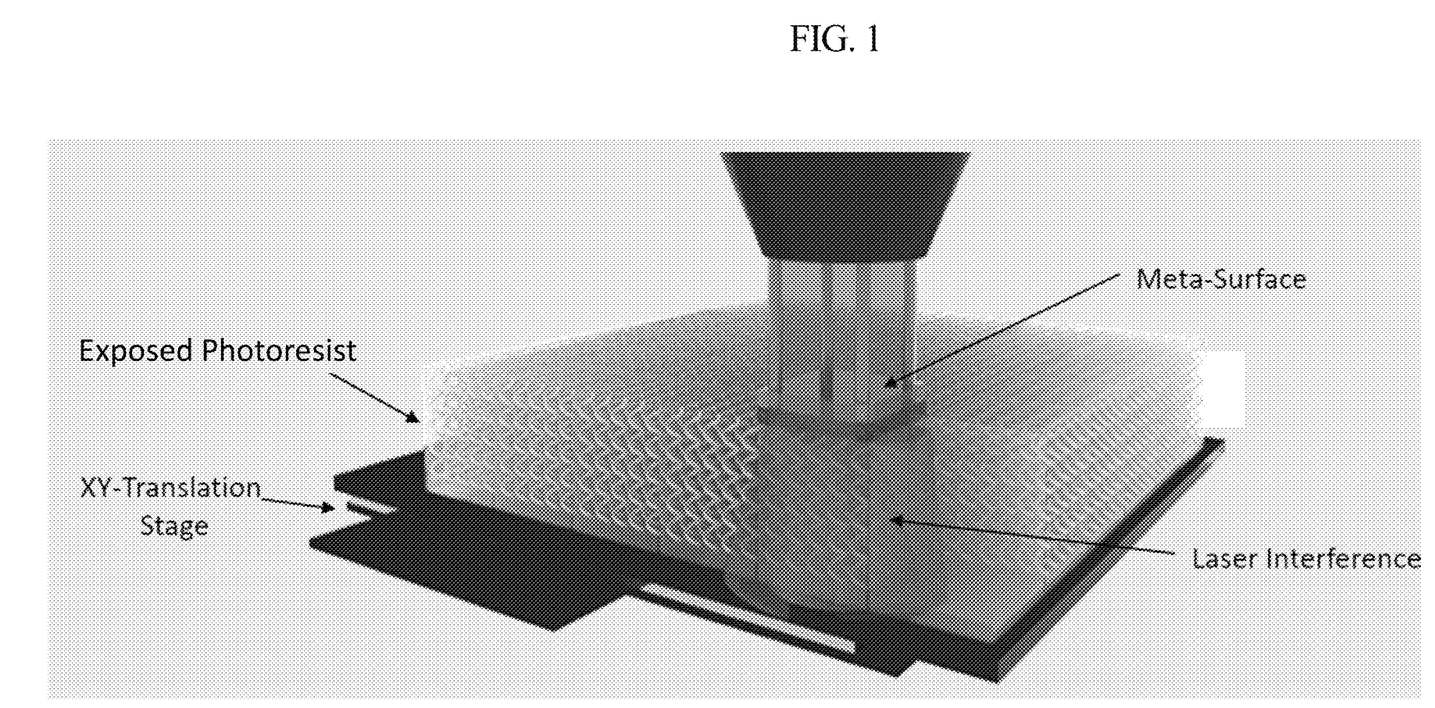
FIG. 1 provides an exemplary system for carrying out the methods provided herein to make the compositions provided herein. The exemplary system includes a translation stage, a photoactive polymer, a patterned metasurface, and a laser source.
Figure 2:
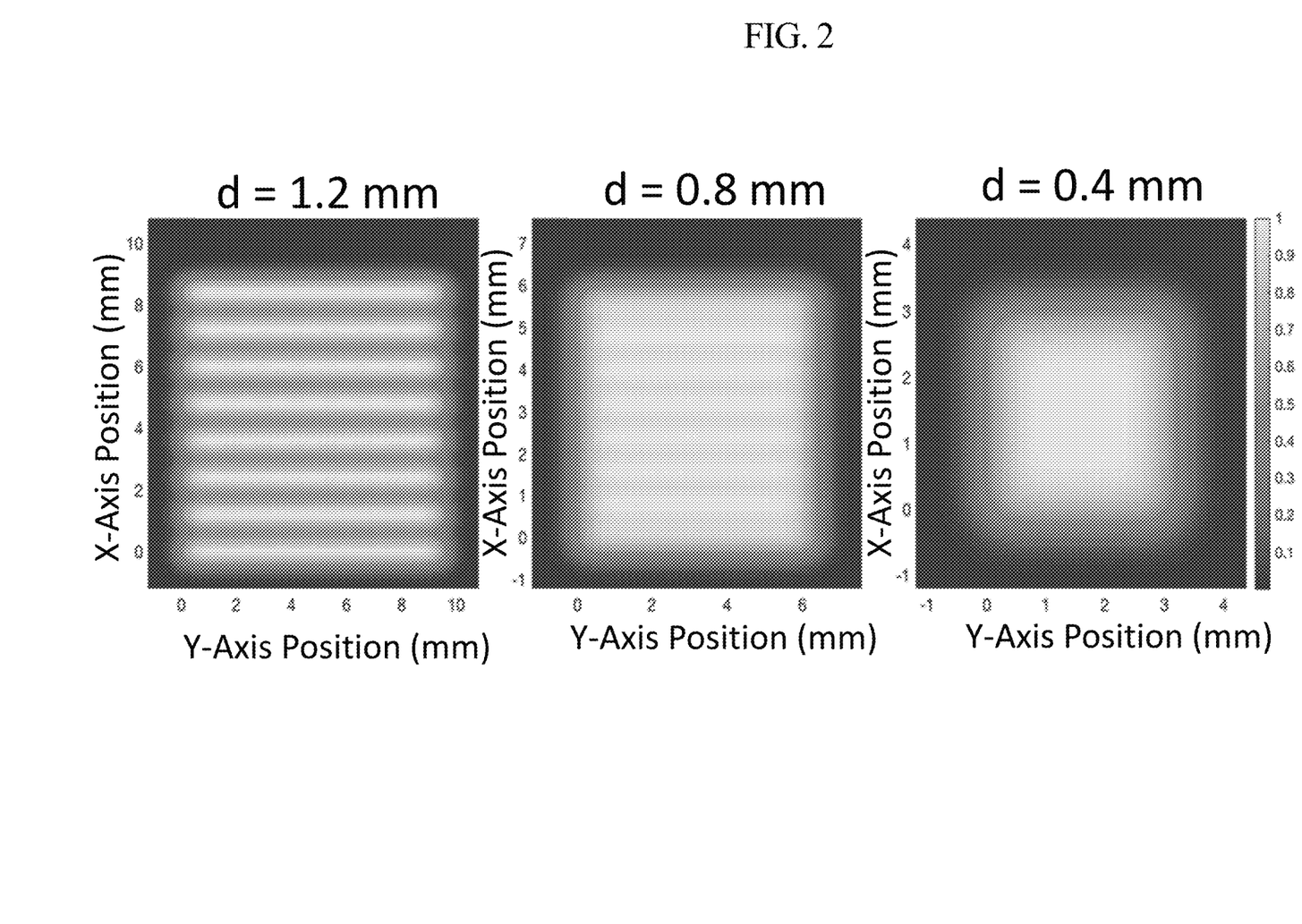
FIG. 2 provides three images of overlapping scan lines.

FIG. 1 provides an exemplary photoactive pre-polymer (Photoresist) disposed on an XY-Translation Stage. In initial experiments, the intensity of a radiation beam was scanned over distance. The beam intensity measurably attenuated over distance. As shown in FIG. 2, by dispersing narrower beam lines at defined distances, the scan lines overlapped to form a convoluted pattern. By selecting the appropriate separation distance, a uniform convolution was achieved.

Figure 3A:
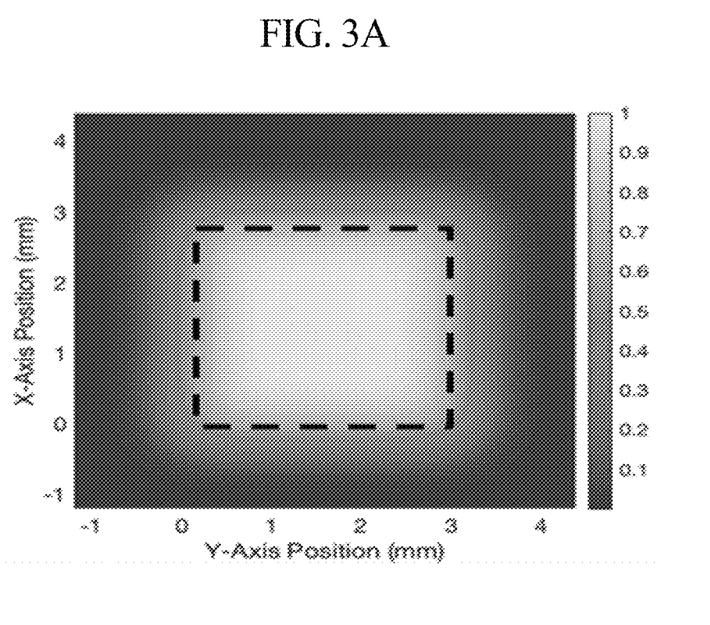
FIG. 3A provides a profile of a Gaussian exposure gradient.
Figure 3B:
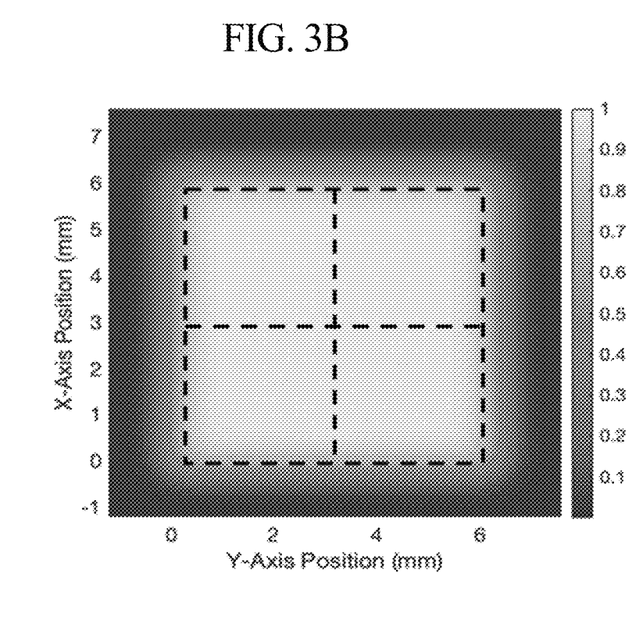
FIG. 3B provides a profile of tiled overlapping exposures providing effectively seamless transitions between tiles.

FIG. 3A provides an image of the radiation source for a single tile. The gradient nature of the Gaussian exposure provided partial exposure at the edges, near the dashed lines in the image. By serially exposing tiled regions of a photoactive pre-polymer with precise edge overlap in FIG. 3B, uniform intensity at the interior edges of the tiles (interior dashed lines) was achieved.

Figure 4A:
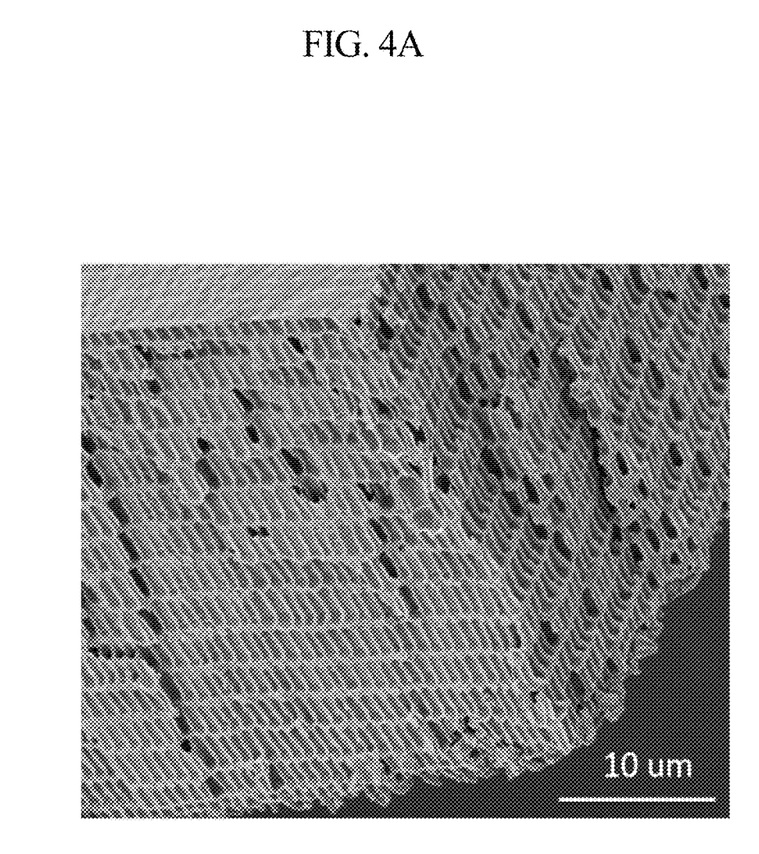
FIG. 4A provides a cross-section of an exemplary composition provided herein.
Figure 4B:
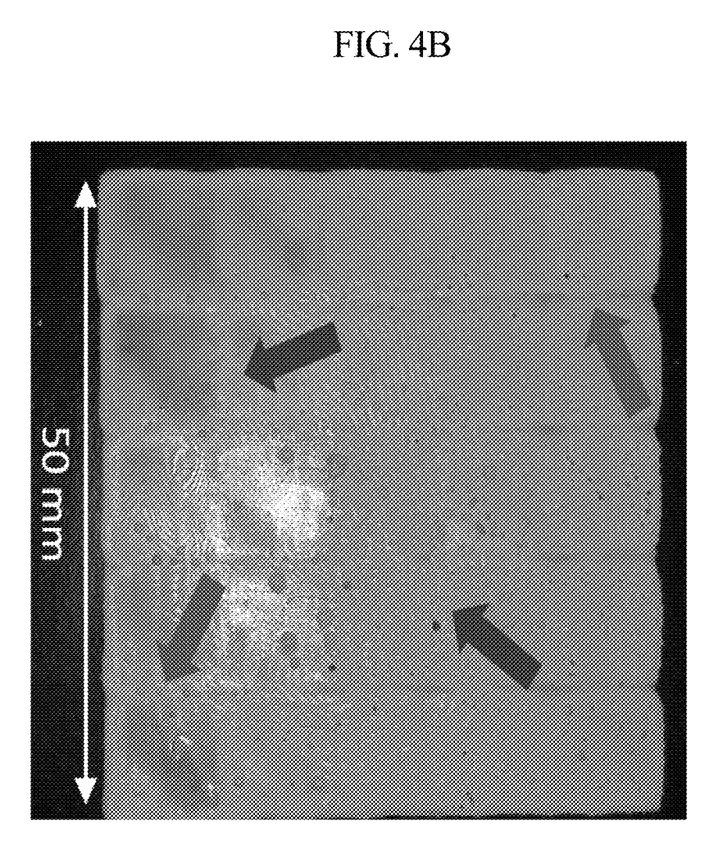
FIG. 4B provides an exemplary tiled composition provided herein. Seams are indicated with arrows.
Figure 5A:
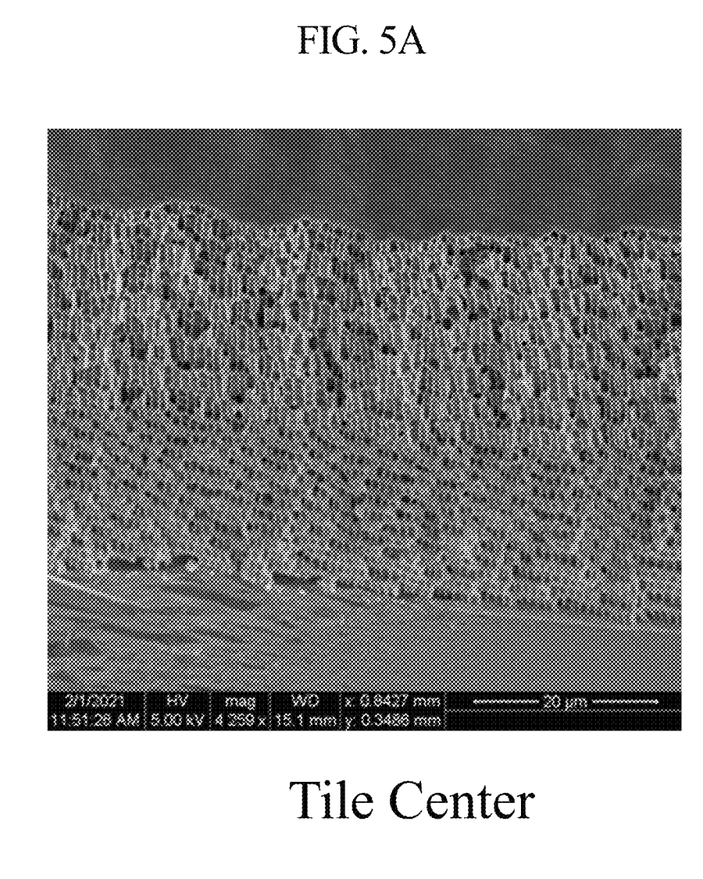
FIG. 5A provides a cross-section of a tile center.
Figure 5B:
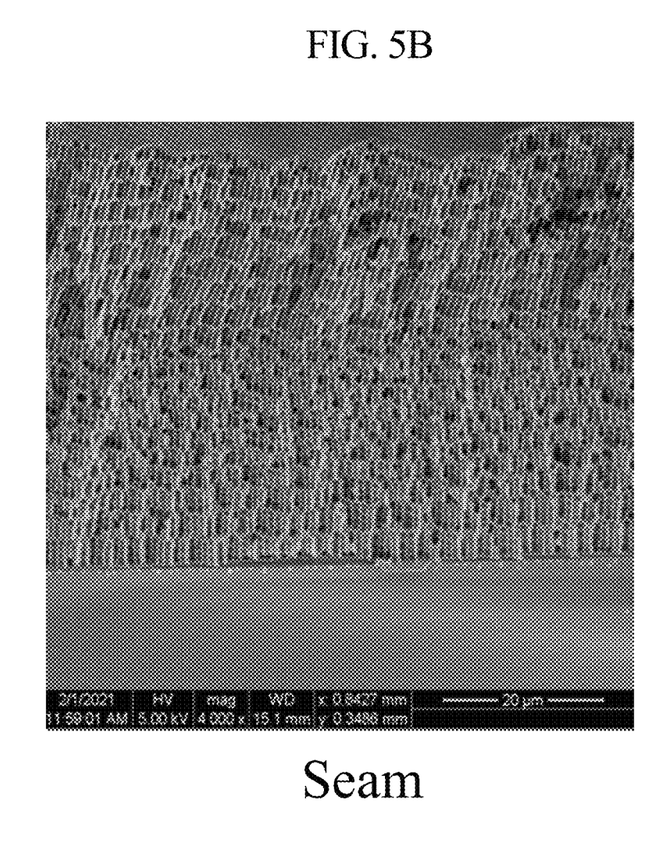
FIG. 5B provides a cross-section of a tile seam.

FIG. 4A provides a cross-section of the composition that was produced, showing unit cells and pores. The composition was homogenous under observation. FIG. 4B provides a tiled composition, where seams are visible at the arrows. FIG. 5A provides a cross-section of a tile center, and FIG. 5B provides a cross-section at a seam. The unit cells, density, and porosity were indistinguishable.

Figure 6:
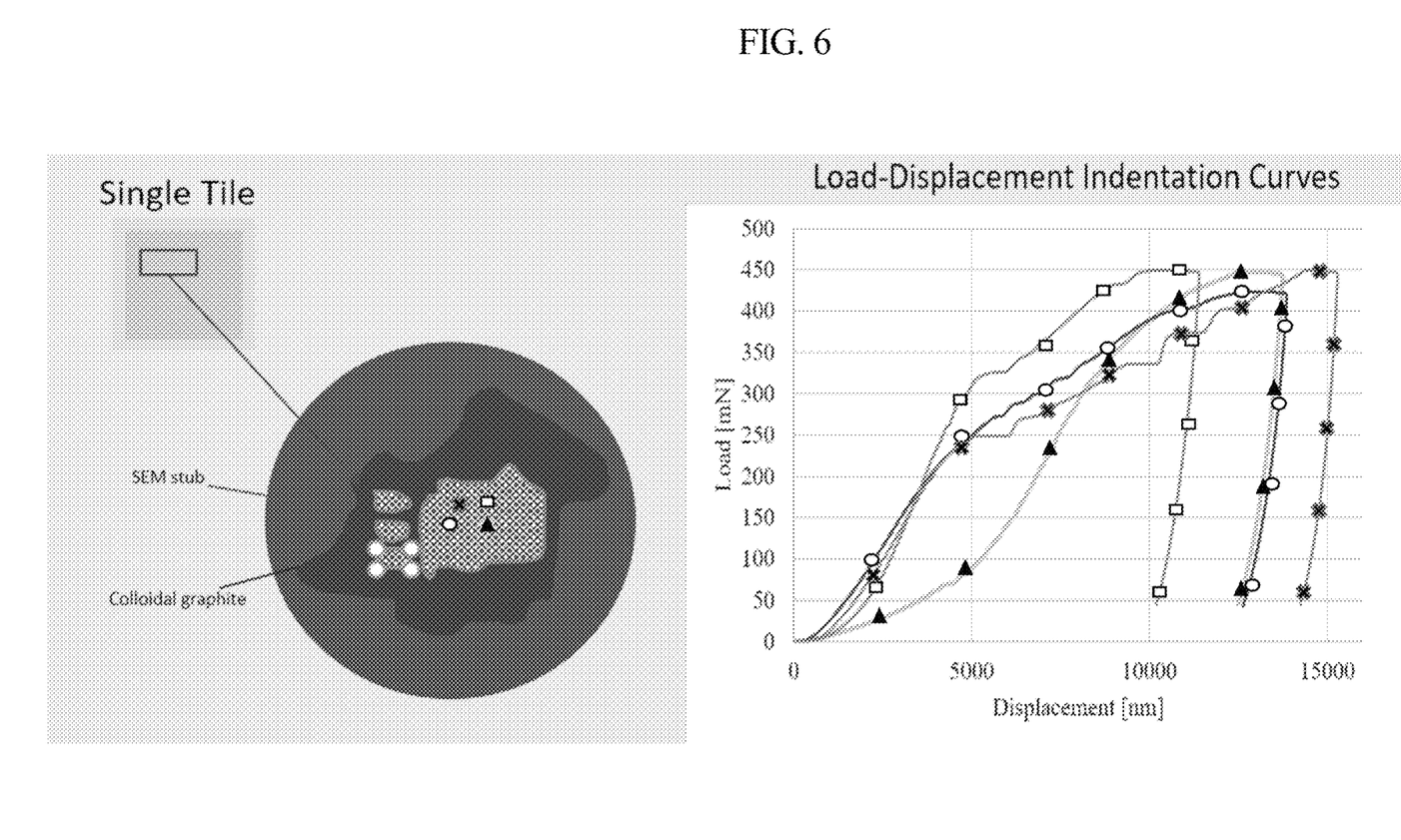
FIG. 6 provides a graph of load (mN) measured versus displacement over a series of regions in a tiled composition provided herein. Load displacement is homogenous across tiles and seams.

FIG. 6 provides load displacement indentation curves along the tiled composition. Load displacement was homogenous across the composition.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Every system, structure, geometry, feature, combination thereof, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

As used herein, "about" preceding a number or amount includes an amount that is up to 10% more or 10% less than the number or amount. More specifically, "about" preceding a number or amount also includes up to 9%, 8%, 7%, 6%, 5%, 4%, 3%, 3%, or 1% more or less than the number or amount.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A method of making a tiled composition comprising the steps of:
   a. contacting a first portion of a photoactive pre-polymer with a volume of radiation from a radiation source sufficient to form a first tile;
   b. translating the radiation source to a second portion of the photoactive pre-polymer, adjacent to the first portion of the photoactive pre-polymer,
      i. wherein the second portion of the photoactive pre-polymer overlaps with the first portion of the previously irradiated photoactive pre-polymer at an overlap region;
   c. contacting the second portion of the photoactive pre-polymer with a sufficient volume of radiation to form a second tile; and
   d. optionally conducting additional translating and contacting steps to form additional adjacent tiles;
   e. wherein each overlap region is at each radiation contacting step is contacted with a fractional amount of radiation relative to the radiation contacting the first portion and the second portion, such that the sum of radiation exposure at each overlap region through each contacting step is substantially similar to the radiation exposure of the first portion and the second portion that form the first tile and second tile; and
   wherein the radiation is provided by volumetric beam shaping.

2. The method of claim 1 wherein the total exposure at each overlap region is sufficient to form a seam with one or more properties substantially similar to the corresponding one or more properties of an adjacent tile.

3. The method of claim 1 wherein the photoactive pre-polymer is disposed on a translation stage capable of performing the translating steps.

4. The method of claim 1 wherein the radiation source comprises a laser source and a patterned metasurface.

5. The method of claim 1 wherein the laser source and the patterned metasurface interact to form an interference pattern capable of forming the unit cells in the photoactive polymer.

6. A system capable of performing the method of claim 1.

7. The system of claim 6, comprising a translation stage capable of translating a photoactive pre-polymer and a radiation source capable of irradiating a photoactive pre-polymer disposed on the translation stage, wherein the radiation source comprises a laser source and a patterned metasurface that interact to form an interference pattern capable of forming a porous, architected three-dimensional geometry in the photoactive pre-polymer.

8. A composition made by the method of claim 1 having length and width dimensions of about 5 mm to about 1000 mm or about 10 mm to about 10,000 mm.

* * * * *